US008330999B2

(12) United States Patent
Nagasaka

(10) Patent No.: US 8,330,999 B2
(45) Date of Patent: Dec. 11, 2012

(54) IMAGE READING APPARATUS AND METHOD TO CORRECT IMAGES

(75) Inventor: Hideaki Nagasaka, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 610 days.

(21) Appl. No.: 12/547,920

(22) Filed: Aug. 26, 2009

(65) Prior Publication Data
US 2010/0053702 A1 Mar. 4, 2010

(30) Foreign Application Priority Data

Aug. 27, 2008 (JP) ................................ 2008-218795

(51) Int. Cl.
*H04N 1/04* (2006.01)

(52) U.S. Cl. ........ 358/474; 358/475; 358/509; 382/275; 382/167

(58) Field of Classification Search .................. 358/475, 358/474, 509, 461, 448, 452, 486, 488, 494, 358/497, 513, 514, 505; 382/275, 274, 166, 382/167
See application file for complete search history.

(56) References Cited

U.S. PATENT DOCUMENTS

| | | | | |
|---|---|---|---|---|
| 5,185,659 | A * | 2/1993 | Itagaki et al. | 348/223.1 |
| 6,611,360 | B1 * | 8/2003 | Kataoka | 358/461 |
| 7,170,643 | B2 * | 1/2007 | Matsui et al. | 358/3.26 |
| 7,202,461 | B2 * | 4/2007 | Muraoka | 250/208.1 |
| 7,473,882 | B2 * | 1/2009 | Kochi | 250/208.1 |
| 7,702,147 | B2 * | 4/2010 | Inukai | 382/162 |
| 7,864,383 | B2 * | 1/2011 | Shiraishi | 358/474 |
| 7,940,431 | B2 * | 5/2011 | Hashizume | 358/446 |
| 7,982,921 | B2 * | 7/2011 | Ikari | 358/448 |
| 2002/0030837 | A1 * | 3/2002 | Hokoi | 358/1.9 |
| 2003/0038983 | A1 * | 2/2003 | Tanabe et al. | 358/461 |
| 2004/0223192 | A1 | 11/2004 | Hiromatsu et al. | |
| 2004/0252201 | A1 * | 12/2004 | Meitav et al. | 348/211.3 |
| 2005/0068552 | A1 | 3/2005 | Kimura | |
| 2005/0083544 | A1 * | 4/2005 | Kondoh | 358/1.9 |

(Continued)

FOREIGN PATENT DOCUMENTS

JP SHO 63-35880 3/1988

(Continued)

OTHER PUBLICATIONS

Japanese Official Action dated Jun. 22, 2010 together with English translation.

*Primary Examiner* — Negussie Worku
(74) *Attorney, Agent, or Firm* — Scully, Scott, Murphy & Presser, P.C.

(57) ABSTRACT

An image reading apparatus to read an image and generate pixel data representing the image is provided. The image reading apparatus includes an image sensor having a plurality of sensor units, each of which includes a plurality of light receiving elements, a data storage store shading correction data, which is used to correct unevenness caused in the pixel data, including first shading correction data, and a data corrector to correct the pixel data output from the light receiving elements based on the shading correction data. The data corrector corrects the pixel data based on the first shading correction data when a number of light receiving elements used to read the image in each sensor unit is greater than a number of pieces of correcting information in the first shading correction data.

24 Claims, 3 Drawing Sheets

U.S. PATENT DOCUMENTS

| | | | |
|---|---|---|---|
| 2008/0074716 A1* | 3/2008 | Yoshihisa | 358/497 |
| 2009/0116080 A1* | 5/2009 | Maruyama | 358/475 |
| 2009/0180134 A1* | 7/2009 | Ikari | 358/1.14 |
| 2009/0219419 A1* | 9/2009 | Kawasaka | 348/251 |
| 2010/0123745 A1* | 5/2010 | Nakaya et al. | 347/9 |

FOREIGN PATENT DOCUMENTS

| | | |
|---|---|---|
| JP | SHO 63-56062 | 3/1988 |
| JP | HEI 1-139671 | 9/1989 |
| JP | HEI 4-144483 | 5/1992 |
| JP | HEI 4-323958 | 11/1992 |
| JP | 8-294004 | 11/1996 |
| JP | HEI 9-252403 | 9/1997 |
| JP | HEI 11-55512 | 2/1999 |
| JP | 2004-254000 | 9/2004 |
| JP | 2005-109831 | 4/2005 |
| JP | 2005-236834 | 9/2005 |
| JP | 2006-303710 | 11/2006 |
| JP | 2008-85600 | 4/2008 |

* cited by examiner

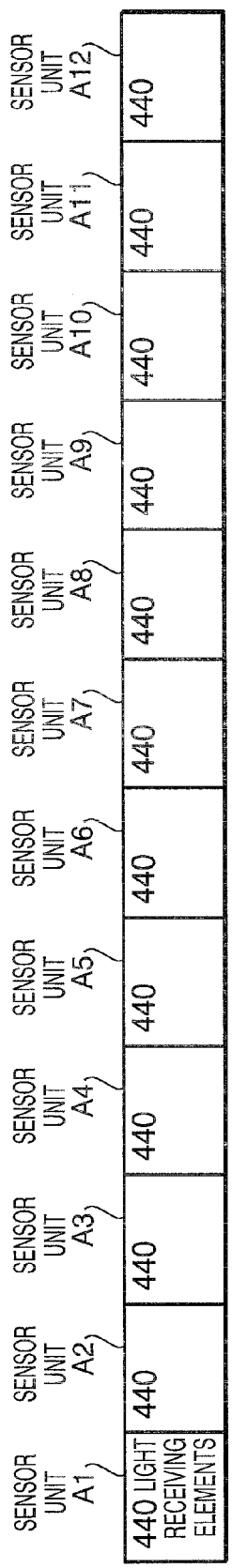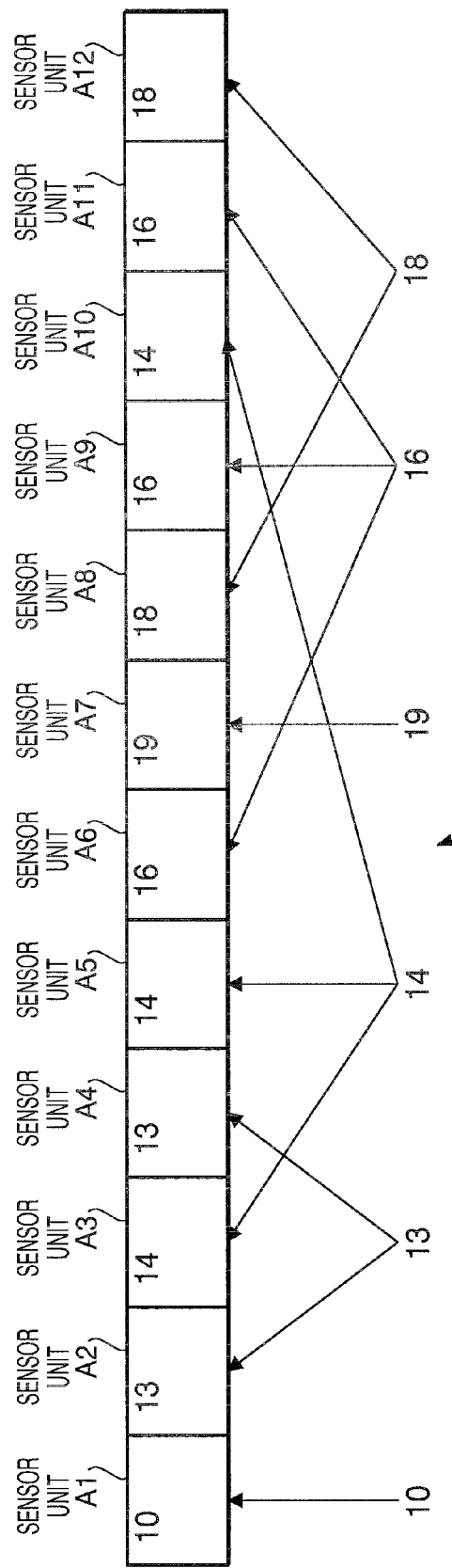

IMAGE READING APPARATUS AND METHOD TO CORRECT IMAGES

CROSS REFERENCE TO RELATED APPLICATION

This application claims priority from Japanese Patent Application No. 2008-218795, filed on Aug. 27, 2008, the entire subject matter of which is incorporated herein by reference.

BACKGROUND

1. Technical Field

An aspect of the present invention relates to an image reading apparatus and a method to correct the read images.

2. Related Art

Image reading apparatus to read images and reproduce the read images have been used, and some image reading apparatuses are capable of correcting values of pixel data, which is obtained from light receiving elements of an image sensor, based on white level correction data (hereinafter also referred to as shading correction data), for improved reproducibility. Such an image reading apparatus is disclosed in, for example, Japanese Patent Provisional Publication No. 2008-85600. According to the disclosure, the shading correction data is a collection of pieces of correcting information, and the number of pieces of information included in the shading correction data is at least equivalent to a number of the light receiving elements. The shading correction data with the number of pieces of correcting information is stored in a memory medium such as a RAM. The pixel data, indicating values of pixels, obtained from the light receiving elements is corrected based on the shading correction data.

SUMMARY

However, the number of light receiving elements equipped to an image sensor is generally large. Therefore, inherently, the number of light receiving elements to be use to read an image is large. Accordingly, the number of information pieces in the shading correction data are large, and a large volume of memory medium to store the large amount of shading correction data has been required.

In view of the above drawbacks, the present invention is advantageous in that an image reading apparatus having a downsized volume of a memory medium to store the shading correction data, with quality of corrected images prevented from being deteriorated, is provided. Further, a method to correct the read image based on the shading correction data stored in the downsized volume, is provided.

According to an aspect of the present invention, an image reading apparatus to read an image and generate pixel data representing the image is provided. The image reading apparatus includes an image sensor having a plurality of sensor units, each of which includes a plurality of light receiving elements to receive light and to output the pixel data being generated according to the received light, a data storage to store shading correction data, which is used to correct unevenness caused in the pixel data, including first shading correction data, the first shading correction data including a number of pieces of correcting information, on the basis of each sensor unit, and the number of pieces of correcting information in the first shading correction data for each sensor unit being smaller than a number of the light receiving elements in each sensor unit, and a data corrector to correct the pixel data output from the light receiving elements based on the shading correction data. The data corrector corrects the pixel data based on the first shading correction data when a number of light receiving elements being used to read the image among the entire light receiving elements equipped in each sensor unit is greater than the number of pieces of correcting information in the first shading correction data.

In general, unevenness of the pixel data output from a plurality of light receiving elements equipped within a sensor unit is relatively smaller than unevenness of the pixel data output from a plurality of light receiving elements equipped in different sensor units. Therefore, the pixel data output from the light receiving elements equipped within a sensor unit may be corrected based on a same piece of correcting information in the shading correction data without lowering a quality of reproducibility of the image. Thus, the pixel data can be corrected based on a smaller number of pieces of correcting information of the shading correction data than the number of the light receiving element to be used to read the image. Because the number of pieces of correcting information in the first shading correction data is smaller than the number of light receiving elements to be used to read the image, according to the above configuration, a volume to store the first shading correction data can be downsized without lowering the quality of reproducibility of the image.

According to another aspect of the present invention, a method to correct an image read by an image reading apparatus having a plurality of image sensors, each of which includes a plurality of light receiving elements to receive light and output pixel data being generated according to the received light, is provided. The method includes steps of storing shading correction data, which is used to correct unevenness caused in the pixel data, including first shading correction data, the first shading correction data including a number of pieces of correcting information, on the basis of each sensor unit, and the number of pieces of correcting information in the first shading correction data for each sensor unit being smaller than a number of the light receiving elements in each sensor unit, and correcting the pixel data output from the light receiving elements based on the shading correction data on the basis of each sensor unit. The pixel data is corrected based on the first shading correction data when a number of light receiving elements being used to read the image among the entire light receiving elements equipped in each sensor unit is greater than the number of pieces of correcting information in the first shading correction data.

According to the above method, the image read by the image reading apparatus can be corrected based on the shading correction data stored in the downsized volume without lowering the quality of reproducibility of the image.

BRIEF DESCRIPTION OF THE ACCOMPANYING DRAWINGS

FIG. 2 is a schematic diagram to illustrate an image sensor of the image scanner according to the embodiment of the present invention.

FIG. 3 is a schematic diagram to illustrate shading correction data commonly created for a plurality of sensor units and stored in a RAM according to the embodiment of the present invention.

DETAILED DESCRIPTION

Hereinafter, a first embodiment according to an aspect of the present invention will be described with reference to the accompanying drawings.

Figure 1:
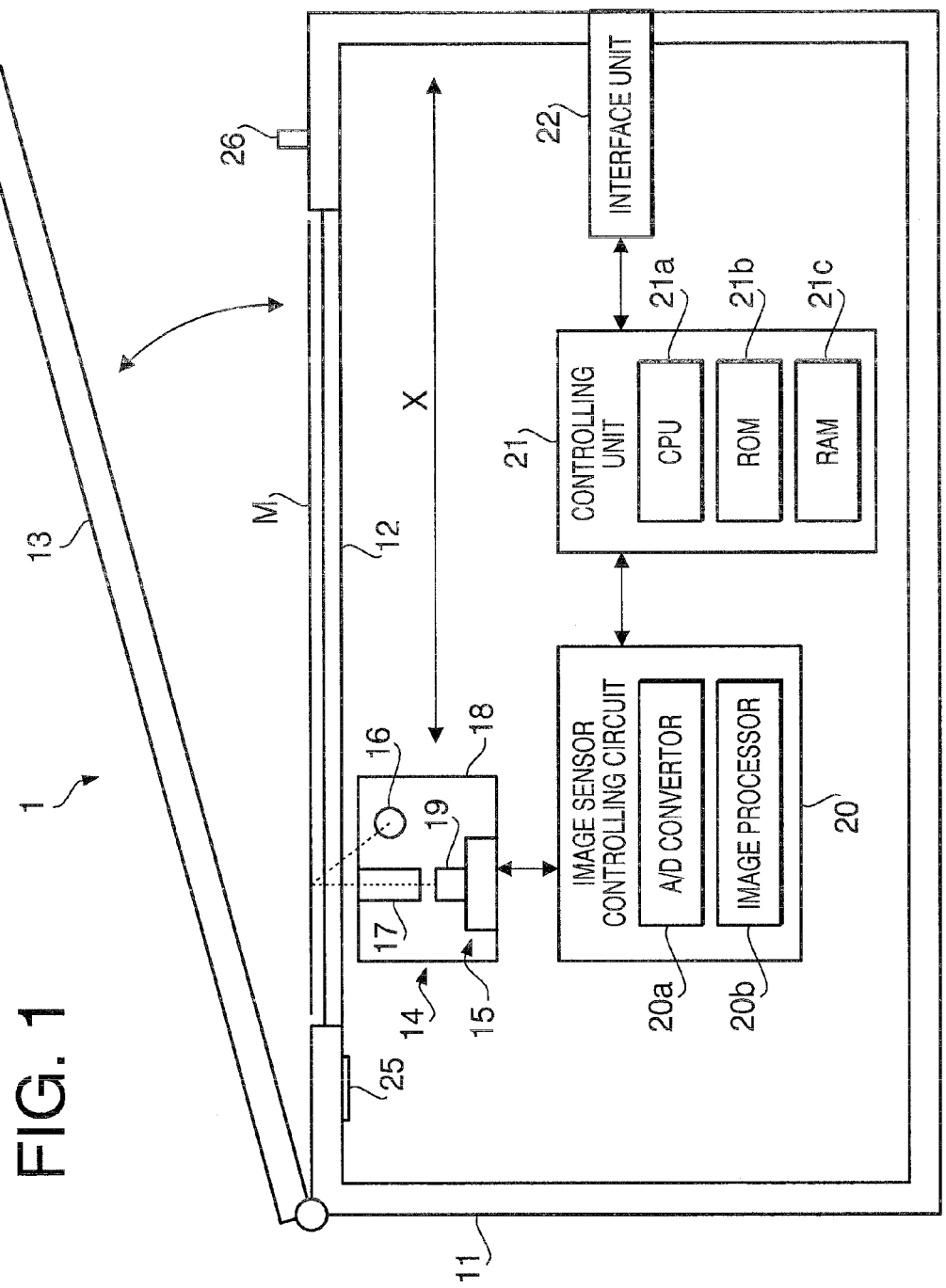
FIG. 1 is a block diagram to illustrate an image scanner according to an embodiment of the present invention.

Firstly, an overall configuration of an image scanner 1 according to the embodiment of the present invention will be described. FIG. 1 is a block diagram to illustrate an image scanner 1 according to an embodiment of the present invention. The image scanner 1 is a flatbed-typed image reading apparatus which reads an original image formed on a document M being placed on a platen glass 12 in CIS (contact image sensing) method.

The image scanner 1 has a chassis 11, which is formed to have a box-like shape. The platen glass 12, on which the document M having the original image is placed to be read, is provided on top of the chassis 11. The platen glass 12 is a sheet of transparent glass, and the document M, e.g., a printed document, a photograph, or pages of a book, is placed thereon to be read. The image scanner 1 further includes a document cover 13, which is rotatable about one end thereof to open and close with respect to the platen glass 12. When the document cover 13 is in a closed position to cover the platen glass 12, external light is blocked thereby and restricted from entering inside of the chassis 11.

The image scanner 1 has a reader unit 14, which includes an image sensor 15, a light source 16, a rod-lens array 17, a carriage 18, and a stepping motor (not shown). The light source 16 may be an RGB (red, green, and blue) colored light-emitting diode. The rod-lens array 17 is an array of lenses, through which light emitted from the light source 16 and reflected on the document M transmits. The light transmitted through the rod-lens array 17 forms an image on light receiving elements 19, which are equipped to the image sensor 15. The image sensor 15, the light source 16, and the rod-lens array 17 are mounted on the carriage 18, which is driven by the stepping motor to reciprocate in a direction indicated X in FIG. 1 (i.e., an auxiliary direction).

The image sensor 15 includes a plurality of light receiving elements 19, which are aligned in line in a main scanning direction (i.e., a vertical direction in FIG. 1 being perpendicular to the direction X). The light receiving elements 19 receives the reflection from the document M and stores electric charges according to brightness of the reflected light being received. The image sensor 15 further includes an output unit (not shown), which converts the electric charges stored in the light receiving elements 19 into electric signals (i.e., pixel signals) and output the generated pixel signals to an image sensor controlling circuit 20. The image sensor 15 may be a CMOS (complementary metal-oxide semiconductor) or a CCD (charge-coupled device).

The image sensor controlling circuit 20 is an ASIC (application specific integrated circuit) and is connected with the reader unit 14 via a flexible flat cable (not shown). The image sensor controlling circuit 20 includes an A/D converter 20a and an image processor 20b. The A/D converter 20a converts the analog pixel signals output from the image sensor 15 into digital pixel data. The image processor 20b applies necessary corrections such as shading correction and gamma correction to the pixel data output from the A/D converter 20a and outputs the corrected data to a control unit 12. The A/D converter 20a is not necessarily included in the image sensor controlling circuit 20 but may be provided independently.

The control unit 21 includes a CPU 21a, a ROM 21b, a RAM 21c, and an NVRAM (not shown). When an instruction to read the document M is entered through an external device such as a PC (not shown) or an operation panel (not shown) provided on the chassis 11 and through an interface unit 22, the controlling unit 21 manipulates specific parts of the image scanner 1 to read the image on the document M and creates image data in a predetermined data format (eg., JPEG, TIFF, etc.) based on the pixel data output from the image processor 20b. The created image data is thereafter transmitted to the external device.

The interface unit 22 includes, for example, an USB interface, a network interface, and the operation panel. The image scanner 1 further includes an open/close sensor 26, which can detect open/close status of the document cover 13. When the document cover 13 is closed with respect to the platen glass 12, for example, the open/close sensor 26 is switched on, and when the document cover 13 is opened, the open/close sensor 26 is switched off. The open/close sensor 26 outputs signals indicating the on-state when the document cover 13 is closed, and outputs signals indicating the off-state when the document cover 13 is open.

FIG. 2 is a schematic diagram to illustrate the image sensor 15 of the image scanner 1 according to the embodiment of the present invention. The image sensor 15 includes, for example, 12 sensor units which are aligned in the main scanning direction, and each of the sensor units includes 440 light receiving elements 19. Therefore, 5280 light receiving elements in total are included in the image sensor 15. Each of the sensor units serves as a smaller image sensor; therefore, when an image sensor with a preferred number of light receiving elements is desired, the number of light receiving elements can be achieved by adjusting the number of sensor units.

Next, the shading correction applied to the pixel data will be described. The shading correction is a process of the pixel data, in which reading unevenness caused in the pixel data is corrected. The reading unevenness of the pixel data can be caused by, for example, uneven sensitivities of the light receiving elements, uneven amounts of incident light due to displaced positions of the light receiving elements with respect to the main scanning direction, and uneven brightness of the light from the light source 16. Generally, the shading is corrected with reference to black reference data and white reference data according to the following formula:

$$\text{Corrected pixel data} = \frac{\text{uncorrected pixel data} - \text{black reference data}}{\text{white reference data} - \text{black reference data}} \times 255 \quad \text{[Formula 1]}$$

In the present embodiment, the pixel data is indicated in 256-scaled value, with 0 indicating undiluted black and 255 indicating undiluted white.

The white reference data referred to in the above formula is shading correction data obtained by having the image sensor 15 read a white reference panel 25 (see FIG. 1) repeatedly for a predetermined times so that a plurality of pieces of pixel data for each light receiving element 19 indicating standard white are sampled, and averaging the plurality of sampled pieces of pixel data. The white reference data is obtained by scanning the white reference panel 25 with the document cover 13 closed and the light source 16 lit. The scanning is repeated for the plurality of times in order to eliminate an influence of electrical noise on the pixel data.

The black reference data in the above formula is shading correction data obtained having the image sensor 15 read the white reference panel 25 repeatedly for a predetermined times so that a plurality of pieces of pixel data for each light receiving element 19 indicating standard black are sampled, and averaging the plurality of sampled pieces of pixel data. The black reference data is obtained by scanning the white reference panel 25 with the document cover 13 closed and the light source 16 turned off.

Next, the shading correction data to be used in the shading correction process will be described. In the present embodiment, the shading correction data includes primary shading correction data and preliminary shading correction data. The primary shading correction data is created when an instruction to read the original image is entered and before a reading operation starts, because conditions (e.g., the brightness of the light emitted from the light source 16) to read the original image are variable. When the primary shading correction data is created shortly before the reading operation, a piece of correcting information for each light receiving element 19 is created; therefore, the number of data pieces of the correcting information in the primary shading correction data is at least equivalent to the number of the light receiving elements 19. When the primary shading correction data is created, however, quality of the primary shading correction data may be affected by disturbances, such as entrance of external light and electric noises caused by the stepping motor to drive the carriage 18, and the primary shading correction data of a suitable quality may not be available.

Therefore, in the present embodiment, the preliminary shading correction data is prepared in advance and stored in the RAM 21c to be used in the correcting process when a disturbance occurs. When the pixel data is corrected based on the preliminary shading correction data, reproducibility of the image can be maintained with a smaller extent of deterioration rather than the pixel data corrected based on the primary shading correction data which is affected by the disturbance.

It is to be noted, generally, a range of unevenness in pixel data, which is output from a plurality of light receiving elements belonging to a same sensor unit, is smaller than a range of unevenness in pixel data, which is output from a plurality of light receiving elements belonging to different sensor units. Therefore, the pixel data output from the light receiving elements within the same sensor unit can be, for example, corrected based on a same piece of shading correction data. Thus, the number of data pieces of the correcting information in the shading correction data can be decreased, and the pixel data can be corrected based on the smaller number of pieces of the correcting information in the shading correction data with the quality of reproducibility maintained in an extent without being noticeably deteriorated.

In the light of the above advantage, the preliminary shading correction data which includes a smaller number of pieces of correcting information is created on basis of the sensor unit and stored in the RAM 21c. The number of pieces of correcting information created is thus reduced to be smaller than the number of light receiving elements 19; therefore, a necessary volume to store the reduced preliminary shading correction data in the RAM can be smaller than a volume to store the unreduced shading correction data having the number of pieces of correcting information at least equivalent to the number of the light receiving elements 19. Thus, the volume to store the preliminary shading correction data in the RAM 21c can be reduced without having the quality of reproducibility of images noticeably deteriorated.

The preliminary shading correction data created and stored on basis of the sensor unit should include a number of pieces of correcting information smaller than the number of light receiving elements 19 within the sensor unit. Therefore, for example, a single piece of correcting information for two (or three) adjoining light receiving elements 19 may be created to be stored so that the pixel data output from those adjoining light receiving elements 19 is corrected commonly based on the single piece of correcting information.

According to the present embodiment, a single piece of preliminary shading correction data can be created for the entire image receiving elements 19 within the single sensor unit 19. In this occasion, the correcting information for each light receiving element 19 within the sensor unit can be obtained and averaged. Alternatively, for example, the pixel data output from alternately picked-up light receiving elements 19 may be collected and averaged to create the single piece of preliminary shading correction data for the sensor unit.

Further, when a single piece of preliminary shading correction data is created and stored for each sensor unit, and when two (or more) pieces of preliminary shading correction data are substantially similar with one another, with the values indicated in the respective preliminary shading correction data falling in a predetermined range, a single and common piece of preliminary shading correction data for the sensor units with similar correcting information can be stored in the RAM 21c instead of storing two (or more) pieces of preliminary shading correction data for the two (or more) sensor units.

FIG. 3 is a schematic diagram to illustrate the preliminary shading correction data commonly created for a plurality of sensor units and stored in the RAM 21c according to the embodiment of the present invention. Framed numbers in FIG. 3 indicate values representing the pieces of preliminary shading correction data for the sensor units.

In the present embodiment, it is assumed that a single and common piece of preliminary shading correction data is stored when the values representing the preliminary shading correction data for a plurality of sensor units fall within a predetermined range with difference between the values being zero. In other words, when the values representing the preliminary shading correction data for a plurality of sensor units are identical, a single piece of preliminary shading correction data is stored commonly for the sensor units. In FIG. 3, a value indicating the preliminary shading correction data for the sensor unit A2 and a value indicating the preliminary shading correction data for the sensor unit A4 are 13 and identical. Therefore, a single and common piece of preliminary shading correction data for both the sensor unit A2 and the sensor unit A4 is stored instead of storing two pieces of preliminary shading correction data indicating the value 13. Similarly, a single and common piece of preliminary correction data for the sensor units A3, A5, and A10 is stored. The values for the remaining sensor units are handled similarly when the values coincide one another. Thus, a volume to store the preliminary shading correction data can be reduced.

Figure 4:
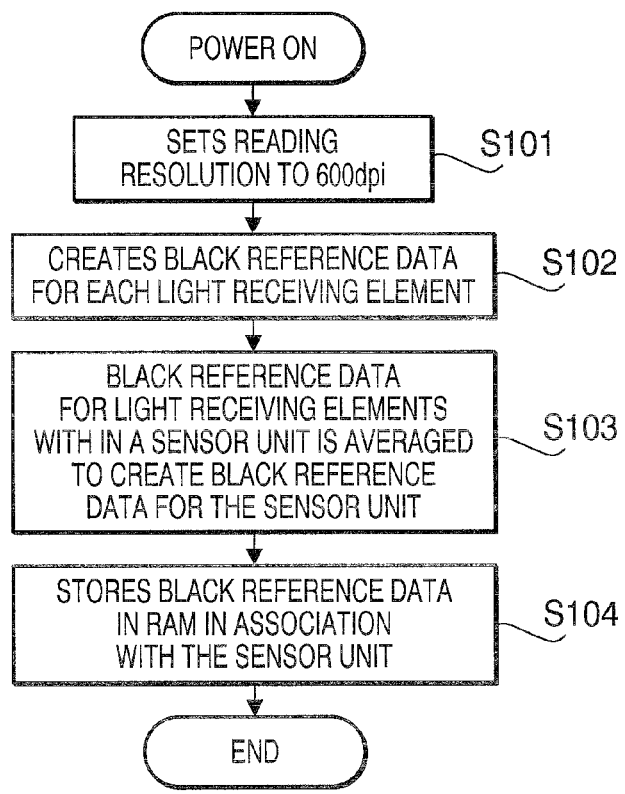
FIG. 4 is a flowchart to illustrate a flow to store the shading correction data in the RAM according to the embodiment of the present invention.

Next, a flow to create the black reference data being the preliminary shading correction data will be described. FIG. 4 is a flowchart to illustrate a flow to store a single piece of preliminary shading correction data for a plurality of sensor units in the RAM 21c according to the embodiment of the present invention. The flow starts, for example, immediately after the image scanner 1 is powered on, and the preliminary shading correction data is maintained in the RAM 21c until the image scanner 1 is powered off. In the following description, the black reference data can be replaced with the white reference data, because the white reference data is created in the similar method except the status (on/off) of the light source 16. Further, in the present embodiment, the values for some sampled light receiving elements 19 among the entire light receiving elements 19 in a sensor unit is averaged to be the black reference data. When the values representing the black reference data for a plurality of sensor units fall within a predetermined range, a single piece of black reference data is stored.

When the flow starts, in S101, the CPU 21a of the image scanner 1 sets a reading resolution to 600 dpi. In the present application, when a reading resolution is set to 1200 dpi, the entire light receiving elements 19 are used in the reading operation. When the reading resolution is set to 600 dpi, a half of the light receiving elements 19 are used alternately. Therefore, with the reading resolution set to 600 dpi, the black reference data for the half of the light receiving elements 19 is created.

In S102, the CPU 21a switches off the light source 16 and scans the white reference panel 25. Further, the CPU 21a averages the pixel data output from the used half of the light receiving elements 19 and creates the black reference data for each light receiving elements 19. In general, the shading correction data is created by averaging the values obtained through a plurality (e.g., 32 times) of scanning operations; however, the preliminary shading correction data may be created based on the values obtained through a single scanning operation. The number of the light receiving elements 19 is 440 per sensor unit; therefore, when the shading correction data for the alternate light receiving elements 19, the number of the light receiving elements 19 being used is 220, which is a sufficiently large number to compensate influences of electrical noises when the values obtained from the light receiving elements 19 are averaged.

In S103, the CPU 21a averages the black reference data for the light receiving element 19 in the sensor unit to create a single piece of black reference data for each sensor unit.

In S104, the CPU 21a stores the black reference data in the RAM 21c in association with the sensor unit. When a plurality of pieces of black reference data indicate values within the predetermined range, a single piece of black reference data for the corresponding sensor units is stored in the RAM 21a in association with those sensor units.

When stored in the RAM 21a, the black reference data may be stored in reduced bits. In particular, when the shading correction data is represented in an 8-bit format (i.e., from 0 to 255), the black reference data tends to occupy the lower 4 bits, and the upper 4 bits are rarely used to represent the black reference data. Therefore, when not in use, the upper 4 bit may be omitted, and only the lower 4 bits of information can be stored in the RAM 21c. Additionally or alternatively, the black reference data may be stored in the RAM 21c in a compressed format. Thus, the volume of the black reference data to be stored in the RAM 21c can be downsized.

Figure 5:
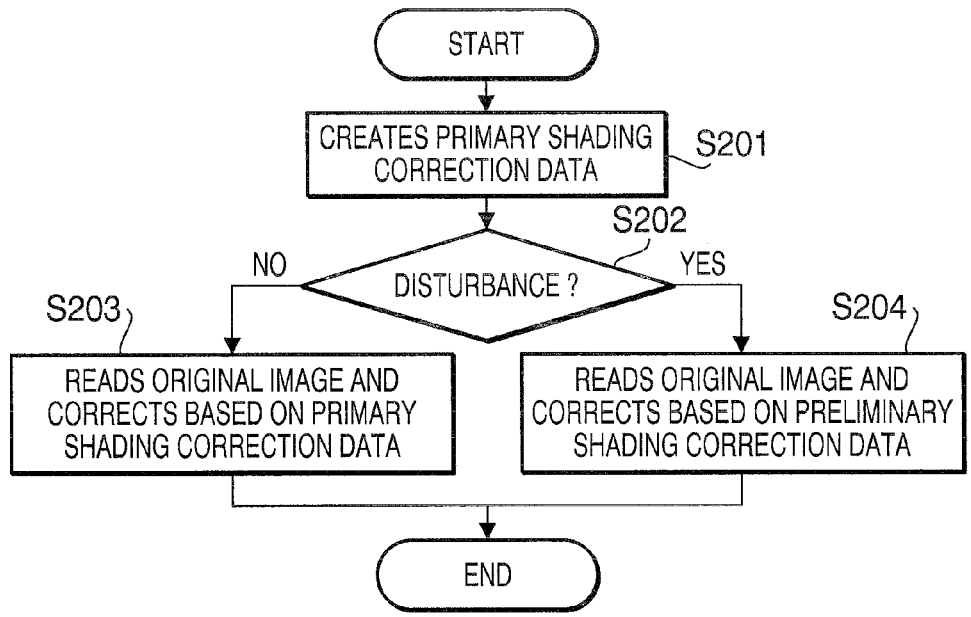
FIG. 5 is a flowchart to illustrate a flow to correct pixel data based on the shading correction data according to the embodiment of the present invention.

Next, a reading operation along with the shading correction process of the image scanner 1 will be described. FIG. 5 a flowchart to illustrate a flow to correct pixel data representing the read image based on the shading correction data according to the embodiment of the present invention. The flow starts when a reading resolution is set to the image scanner 1 and an instruction to read the original image is entered.

When the flow starts, in S201, the CPU 21a creates black reference data for each light receiving element 19 with the light source 16 turned off. Further, the CPU 21a switches the light source 16 on and creates white reference data. Thereafter, the CPU 21a stores the black reference data and the white reference data, which are the primary shading correction data, in the RAM 21c. The primary shading correction data may be deleted when, for example, an instruction to start a next reading operation is entered. Alternatively, primary shading correction data generated in the previous reading operation may be updated by primary shading correction data generated in the next reading operation.

In S202, the CPU 21a examines to judge as to whether a disturbance occurred while the primary shading correction data is created in S201. The judgment may be made, for example, based on the black reference data created in S201. As has been previously described, the primary shading correction data including the black reference data is created based on repeatedly obtained and averaged results of a plurality of reading operations. Therefore, a disturbance of a small extent can be compensated in the averaged results. When a disturbance of a larger extent occurs, however, the influence of the disturbance may not be compensated in the averaged data and may deteriorate the quality of primary shading correction data. In this occasion, values representing the black reference data tend to be distinctly away from 0, which indicates undiluted black, and closer to 255, which indicates undiluted white. Therefore, the judgment may be made, for example, based on a predetermine threshold, e.g., 128, and when the black reference data includes a predetermined number of values larger than the predetermined threshold, it is determined that a disturbance has occurred.

The white reference data, on the other hand, is generated with the light source 16 turned on, and the pixel data may not be distinctly affected by incidence of external light. Accordingly, the judgment concerning the disturbance based on the tendency of the values in the white reference data may not be reliable. Therefore, the judgment concerning the disturbance during creation of the white reference data can be made based on the state of the document cover 13. In particular, it may be judged that external light entered when the open/close sensor 26 detects an opening motion of the document cover 13 or senses open state of the document cover 13 for a predetermined time period. It is to be noted that occurrence of electrical noises may not distinctly be recognized; therefore, the judgment may be made based solely on the incidence of external light. When the CPU 21a judges that no disturbance occurred (S202: NO), the flow proceeds to S203. When the CPU 21a judges that a disturbance occurred (S202: YES), the flow proceeds to S204.

In S203, the CPU 21a manipulates the reader unit 14 to read the original image in lines and creates pixel data. Further, the CPU 21a corrects the pixel data according to the primary shading correction data.

In S204, the CPU 21a manipulates the reader unit 14 to read the original image in lines and creates pixel data. Further, the CPU 21a corrects the pixel data according to the preliminary shading correction data. Correction of the pixel data according preliminary shading correction data will be described hereinbelow.

When the pixel data is corrected according to the preliminary shading correction data, firstly, the CPU 21a selects one of the sensor units A1-A12 and determines pixel data obtained from the selected sensor unit. Determination may be made, for example, in a following procedure.

When the reading resolution is set to 1200 dpi, for example, a number of pieces of pixel data in a line to be scanned is 5280. Meanwhile, pixel data obtained from the sensor unit A1 includes data pieces from a first to a 440th, and pixel data obtained from the sensor unit A2 includes data pieces from a 441st to a 880th. When the reading resolution is set to 600 dpi, for another example, a number of pieces of pixel data in line to be scanned is 2640. Meanwhile, pixel data obtained from the sensor unit A1 includes data pieces from a first to a 220th, and pixel data obtained from the sensor unit A2 includes data nieces from a 221st to a 440th. Thus, pieces of pixel data obtained from the selected sensor unit can be identified with reference to the reading resolution set in the image scanner 1. For a different reading resolution, determination of the pixel data can be made similarly.

Secondly, the CPU 21a develops and makes duplicates of the preliminary shading correction data stored in association with the selected sensor unit. The number of duplicates to be made corresponds to the number of pieces of the determined pixel data for the selected sensor unit. Thus, the pixel data is corrected according to the duplicated preliminary shading correction data. The number of light receiving elements 19 in each sensor unit to be used in the reading operation is, when the reading resolution is 1200 dpi, 440. The number of the light receiving elements 19 in each sensor unit is 220 when the reading resolution is 660 dpi, and 110 when the reading resolution is 300 dpi. In the meantime, each sensor unit is associated with a single piece of preliminary shading correction data. Thus, the number of light receiving elements 19 to be used in the reading operation is greater than the number of piece of the correcting information in the preliminary shading correction data, which is one, at all time regardless of the size of the reading resolution. Therefore, when the number of light receiving elements 19 to be used in the reading operation is larger than the number of pieces of correcting information in the preliminary shading correction data being stored, the pixel data is corrected based on the preliminary shading correction data. When the correction is applied to the entire sensor units, S204 is completed. The preliminary shading correction data created in According to the image scanner 1 in the above embodiment, the volume of the RAM 21c to store the shading correction data can be reduced without noticeably lowering quality of the image reproducibility.

According to the above embodiment, when no disturbance occurred while the primary shading correction data is created, the primary shading correction data is used to correct the pixel data. Therefore, the image reproducibility can even be improved.

According to the above embodiment, further, a single piece of preliminary shading correction data is stored for a single sensor unit; therefore, the volume of the RAM 21c to store the preliminary shading correction data can even be reduced.

Furthermore, a single and common piece of preliminary shading correction data is stored for a plurality of sensor units when values representing a plurality of pieces of preliminary shading correction data fall within a predetermined range. Therefore, the volume of the RAM 21c to store the preliminary shading correction data can even be reduced.

Furthermore, the pixel data output and obtained from each sensor unit can be determined according to the reading resolution; therefore, storing an order of the pixel data being output to the CPU 21a in the RAM 21c in association with the corresponding sensor units on the reading resolution basis is not necessary Thus, the volume of the RAM 21c to be used can even be reduced.

According to the above embodiment, further, the number of data bits of the preliminary shading correction data can be reduced so that the volume of the RAM 21c to store the preliminary shading correction data can even be reduced.

According to the above embodiment, further, the preliminary shading correction data includes the black reference data; therefore, the pixel data can be corrected based on the black reference data.

According to the above embodiment, furthermore, the preliminary shading correction data can be replaced with newly created preliminary shading correction data; therefore, when sensibilities of the light receiving elements 19 are deteriorated with age, the preliminary shading correction data can be updated according to the aged sensibilities of the light receiving elements 19.

Although an example of carrying out the invention has been described, those skilled in the art will appreciate that there are numerous variations and permutations of the image reading apparatus and the method to read images that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiment, the black reference data and the white reference data both being the preliminary shading correction data are stored in the RAM 21c. However, solely one of the black reference data and the white reference data may be the preliminary shading correction data to be stored. In this regard, the black reference data, which is more sensitive to the external light, may be more preferable for the preliminary shading correction data to be stored.

In the above embodiment, a single piece of preliminary shading correction data is created and store for each sensor unit. However, for example, the number of pieces of the correcting information in the preliminary shading correction data for the respective sensor units may vary.

For another example, the preliminary shading correction data may not necessarily be created upon power-on of the image scanner 1, but may be created and stored in the ROM 21b in advance when the image scanner 1 is manufactured.

In the above embodiment, the shading correction data includes the white reference data and the black reference data which are created by reading a white image and a black image. However, the shading correction data may include, for example, reference data which is created by reading a gray-colored image.

In the above embodiment, the primary shading correction data is created based on an averaged result of a plurality of repeated scanning operations. However, the primary shading correction data may be created based on a reduced number of scanning operations and the preliminary shading correction data. For example, when the primary shading correction data is to be created based on results of 32-times repeated scanning operations, the 32 scanning operations can be replaced with 16-times repeated scanning operations, and results to be obtained by the remaining 16-times scanning operations to be repeated can be replaced with the preliminary scanning data. The obtained results can be averaged on the basis of light receiving element 19. Thus, the primary shading correction data can be created in a shorter period of time.

Usage of the preliminary shading correction data is not limited to correction of pixel data. For example, the white reference data may be used to detect incomplete insertion of a flexible flat cable of the image scanner 1. When connection by the flexible flat cable between the image sensor controlling circuit 20 and the reader unit 14 is incomplete, values representing the white reference data tend to be lowered. Therefore, the incomplete connection can be detected based on the tendency. It is to be noted, however, that the values representing the white reference data may be increased when disturbance occurs during creation of the primary shading correction data, and the incomplete connection may not be distinctly detected. Therefore, when the disturbance occurs, the connection can be examined based on the preliminary shading correction data instead of the primary shading correction data.

For another example, the preliminary shading correction data may be used to examine sensitivities of the light receiving elements 19. When the sensitivities of the light receiving elements 19 are lowered, the values representing the white reference data also tend to be lowered. Therefore, deteriorated light receiving elements 19 can be detected based on the tendency. Again, the values representing the white reference data may be increased when disturbance occurs during creation of the primary shading correction data, and the light receiving elements 19 with lowered sensitivities may not be distinctly detected. Therefore, when the disturbance occurs, the sensitivities can be examined based on the preliminary shading correction data instead of the primary shading correction data.

The present invention may not necessarily be the image scanner 1 in the above embodiment, but also be applied to a multi-function peripheral equipped with a scanning function, a printing function, and facsimile transmission function.

What is claimed is:

1. An image reading apparatus to read an image and generate pixel data representing the image, comprising:
    an image sensor having a plurality of sensor units, each sensor unit including a plurality of light receiving elements configured to receive light and to output the pixel data being generated according to the received light;
    a data storage configured to store shading correction data for correcting unevenness in the pixel data, the data storage pre-storing first shading correction data, the first shading correction data including a number of pieces of correcting information for each sensor unit, the number of pieces of correcting information in the first shading correction data being smaller than a number of the light receiving elements in each sensor unit; and
    a data corrector configured to correct the pixel data output from the light receiving elements based on the first shading correction data.

2. The image reading apparatus according to claim 1, further comprising:
    a correction data creating unit configured to create second shading correction data, which includes a number of pieces of correcting information, upon entry of an instruction to read the image, each piece of correcting information being generated respectively for each of the light receiving elements used to read the image; and
    a judging unit to judge whether a disturbance occurred during creation of the second shading correction data,
    wherein the data corrector corrects the pixel data based on the second shading correction data when the judging unit judges that no disturbance occurred during creation of the second shading correction data and corrects the pixel data based on the first shading correction data when the judging unit judges that a disturbance occurred during creation of the second shading correction data.

3. The image reading apparatus according to claim 2, wherein the correction data creating unit is further configured to create the first shading correction data.

4. The image reading apparatus according to claim 3, wherein the correction data creating unit creates the first shading correction data when the image reading apparatus enters a predetermined state, and the created first shading correction data is maintained until termination of the predetermined state.

5. The image reading apparatus according to claim 1, wherein the data storage stores a single piece of correcting information of the first shading correction data for each sensor unit.

6. The image reading apparatus according to claim 5, wherein the data storage stores the single piece of correcting information of the first shading correction data for a plurality of sensor units when the pieces of correcting information of the first shading correction data for the plurality of sensor units indicate values within a predetermined range.

7. The image reading apparatus according to claim 6, wherein the data storage stores the single piece of correcting information of the first shading correction data for the plurality of sensor units when the pieces of correcting information of the first shading correction data for the plurality of sensor units indicate an identical value.

8. The image reading apparatus according to claim 6, wherein the single piece of correcting information to be stored is obtained by averaging the values indicating the correcting information of the first shading correction data for the plurality of sensor units within the predetermined range.

9. The image reading apparatus according to claim 1,
    wherein a reading resolution of the image sensor is changeable; and
    wherein the number of light receiving elements to be used to read the image is determined based on the reading resolution.

10. The image reading apparatus according to claim 9, wherein the pixel data output from a specific sensor unit among the plurality of sensor units is identified based on the reading resolution of the image sensor.

11. The image reading apparatus according to claim 1, wherein the data storage stores the first shading correction data indicated in reduced bits.

12. The image reading apparatus according to claim 11, wherein the data storage stores lower bits indicating the first shading correction data and omits upper bits of the first shading correction data.

13. The image reading apparatus according to claim 1, wherein the first shading correction data is black reference data which is created based on a black image.

14. The image reading apparatus according to claim 1, wherein the first shading correction data is white reference data which is created based on a white image.

15. A method to correct an image read by an image reading apparatus having a plurality of image sensors, each of which includes a plurality of light receiving elements to receive light and output pixel data being generated according to the received light, comprising steps of:
    storing shading correction data for correcting unevenness in the pixel data, first shading correction data being pre-stored, the first shading correction data including a number of pieces of correcting information for each sensor unit, the number of pieces of correcting information in the first shading correction data being smaller than a number of the light receiving elements in each sensor unit; and
    correcting the pixel data output from the light receiving elements based on the shading correction data on the basis of each sensor unit.

16. The method according to claim 15, further comprising:
    creating second shading correction data, which includes a number of pieces of correcting information, upon entry of an instruction to read the image, each piece of correcting information being generated respectively for each of the light receiving elements used to read the image; and
    judging whether a disturbance occurred during creation of the second shading correction data,
    wherein the pixel data is corrected based on the second shading correction data when judgment is made that no disturbance occurred during creation of the second shading correction data, and the pixel data is corrected based on the first shading correction data when judgment is made that a disturbance occurred during creation of the second shading correction data.

17. The method according to claim 15, wherein a single piece of correcting information of the first shading correction data is stored for each sensor unit in the step of storing.

18. The method according to claim 17, wherein the single piece of correcting information of the first shading correction data is stored for a plurality of sensor units in the step of storing when the pieces of correcting information of the first shading correction data for the plurality of sensor units indicate values within a predetermined range.

19. The method according to claim 18, wherein the single piece of correcting information of the first shading correction data for the plurality of sensor units is stored when the pieces of correcting information of the first shading correction data for the plurality of sensor units indicate an identical value.

20. The method according to claim 18, wherein the single piece of correcting information to be stored is obtained by averaging the values indicating the correcting information of the first shading correction data for the plurality of sensor units within the predetermined range.

21. The method according to claim 15, wherein the first shading correction data is stored in reduced bits in the step of storing.

22. The method according to claim 21, wherein lower bits indicating the first shading correction data is stored and upper bits of the first shading correction data is omitted in the step of storing.

23. The method according to claim 15, wherein the first shading correction data is black reference data which is created based on a black image.

24. The method according to claim 15, wherein the first shading correction data is white reference data which is created based on a white image.

* * * * *